(12) United States Patent
Shen et al.

(10) Patent No.: US 8,211,959 B2
(45) Date of Patent: Jul. 3, 2012

(54) BIODEGRADABLE COPOLYMER HYDROGELS

(75) Inventors: Hsin-Hsin Shen, Hsinchu County (TW); Chin-Fu Chen, Sinjhuang (TW); Meng-Yow Hsieh, Taipei (TW); Miao-Tzu Chen, Changhua County (TW); Wen-Fu Lee, Taipei (TW)

(73) Assignee: Industrial Technology Research Institute (TW)

( * ) Notice: Subject to any disclaimer, the term of this patent is extended or adjusted under 35 U.S.C. 154(b) by 344 days.

(21) Appl. No.: 12/570,588

(22) Filed: Sep. 30, 2009

(65) Prior Publication Data

US 2010/0166863 A1    Jul. 1, 2010

(30) Foreign Application Priority Data

Dec. 31, 2008  (TW) ................................ 97151763 A (51) Int. Cl.
*C08F 299/04* (2006.01)
*C08F 283/10* (2006.01)
(52) U.S. Cl. ....................................... 523/522; 523/423
(58) Field of Classification Search .................. None
See application file for complete search history.

(56) References Cited

U.S. PATENT DOCUMENTS

| | | | |
|---|---|---|---|
| 5,410,016 A | 4/1995 | Hubbell et al. |
| 5,470,944 A | 11/1995 | Bonsignore |
| 5,514,380 A | 5/1996 | Song et al. |
| 5,567,435 A | 10/1996 | Hubbell et al. |
| 5,702,717 A | 12/1997 | Cha et al. |
| 5,936,045 A | 8/1999 | Warzelhan et al. |
| 5,986,043 A | 11/1999 | Hubbell et al. |
| 6,004,573 A | 12/1999 | Rathi et al. |
| 6,060,582 A | 5/2000 | Hubbell et al. |
| 6,117,949 A | 9/2000 | Rathi et al. |
| 6,136,333 A | 10/2000 | Cohn et al. |
| 6,201,072 B1 | 3/2001 | Rathi et al. |
| 6,451,346 B1 | 9/2002 | Shah et al. |
| 6,841,617 B2 | 1/2005 | Jeong et al. |
| 7,087,244 B2 | 8/2006 | Jeong et al. |
| 7,094,810 B2 | 8/2006 | Sant et al. |
| 7,153,520 B2 | 12/2006 | Seo et al. |
| 7,179,867 B2 | 2/2007 | Chang et al. |
| 2002/0161134 A1 | 10/2002 | Kim et al. |
| 2004/0219175 A1 | 11/2004 | Kan et al. |

OTHER PUBLICATIONS

Jukka Tuominen, "Chain Linked Lactic Acid Polymers: Polymerization and Biodegradation Studies," Polymer Technology Publication Series, Espoo 2003, No. 25.
Tommy Tarvainen et al., "Degradation of and drug release from a novel 2,2-bis(2-oxazoline) linked poly(lactic acid) polymer," Journal of Controlled Release 81 (2002) pp. 251-261.
Tommy Tarvainen et al., Drug release profiles from and degradation of a novel biodegradable polymer, 2,2-bis(2-oxazoline) linked poly(ε-caprolactone), European Journal of Pharmaceutical Sciences 16 (2002) pp. 323-331.
Riccardo Po et al., Synthesis and Characterization of Poly(esteramide)s from Bis(2-oxazoline)s, Anhydrides, and Diols, Macromolecules 1995, 28 pp. 5699-5705.
Tommy Tarvainen et al., Pancreatin enhanced erosion of and macromolecule release from 2,2-bis(oxazoline)-linked poly(c-caprolactone), Journal of Controlled Release 86 (2003) pp. 213-222.
European Search Report from corresponding application No. EP 09 17 3765.

*Primary Examiner* — Doug Schultz
(74) *Attorney, Agent, or Firm* — Lowe Hauptman Ham & Berner, LLP (57) ABSTRACT

Biodegradable copolymer hydrogels are provided. The biodegradable copolymer hydrogels have a structure of Formula (I) or Formula (II)

A-B—BOX—B-A                Formula (I)

B-A-B—(BOX—B-A-B)$n$-BOX—B-A-B       Formula (II), wherein, A comprises a hydrophilic polyethylene glycol polymer (A); B comprises a hydrophobic polyester polymer (B); BOX is bifunctional group monomer of 2,2'-Bis(2-oxazoline) and used for coupling the blocks A-B or B-A-B; and n is an integer, equal to or greater than 0.

38 Claims, 7 Drawing Sheets

BIODEGRADABLE COPOLYMER HYDROGELS

CROSS REFERENCE TO RELATED APPLICATIONS

This application is based upon and claims the benefit of priority from the prior Taiwan Patent Application No. 97151763, filed on Dec. 31, 2008, the entire contents of which are incorporated herein by reference.

BACKGROUND OF THE INVENTION

1. Field of the Invention

The invention relates to a hydrogel, and more particularly to a biodegradable copolymer hydrogel.

2. Description of the Related Art

In most instances, a substitutive tissue must be used to recover the functionality of body tissue damaged by disease, unless the original tissues have a high inherent regeneration capacity. The unavailability of acceptable human donor organs, and the low rate of long term success due to host versus graft rejection are the main challenges now facing the field of tissue and organ transplantation.

In order to solve the above problems, biomaterials (such as synthetic or natural matrix serving as carriers) are provided to be implanted in the desired region to facilitate cell seeding. According to medical statistics, approximately 30% of tissue reconstruction processes performed relate to bone tissue reconstruction.

In recent years, biomaterials have been applied to reconstruct hard tissues and soft tissues of bone structures. For reconstruction of hard tissues, a key challenge is to facilitate fixation of bone fragments in an articular surface fracture or a comminuted fracture. Thus, a bone fixation device has been developed. The bone fixation device, such as a K-pin, bone nail, or cable or anchor, had a micro-textured contact surface to enhance the installation or gripping characteristics thereof.

For soft tissues, adherence to the bone fragments are peeled off before using bone fixation devices, thereby causing poor circulation of blood and increasing risk of nonunion fracture. In addition, when using bone fixation devices for soft tissues, bone fragments are further disintegrated following the surgical operation.

At present, most bone cements are primarily made of polymethyl methacrylate (PMMA). The bone cement can provide sufficient strength for the bone fracture at an early stage. Patients using the bone cement are not apt to develop allergies thereto due to the biologically inert properties thereof. Specifically, the bone cement is non-biodegradable. Therefore, the fixation of bone fragments using the bone cement is not a substantially complete bone union and the bone cement is not suitable for traumatic fractures.

For soft tissues repair, sutureless anchors and knotless anchors are used to substitute suture anchors in order to avoid histological reactions resulting from knots and reduce the surgical time. The sutureless anchor, however, is apt to cause ridgy regenerative tissues due to stress, resulting in the ridgy regenerative tissues and the original tissues not being able to dovetail into each other. A bioadhesion can be further used to increase the anastomosis between the original tissues and the regenerative tissues fixed by the knotless anchors or sutureless anchors, enhancing the regeneration of tissues.

Further, bioadhesion can be applied in the ischemic necrosis of femoral head repair, such as the reconstruction of a hip joint. Avascular necrosis (AVN) is a disease, for young adults, resulting from the temporary or permanent loss of blood supply to bones. With early diagnosis, at least 75% of the patient with AVN can recover after treatment. Various treatments for AVN focus on salvaging the head of the femur or other bone or joint such as core decompression. A necrotic tissue is first removed and packed with an autologous cancellous bone leaving room for the insertion of an autologous fibular graft with an autologous fibular graft vascular pedicle, the peroneal vessels, attached, to provide abundant blood flow to the head of a femur. An anastomosis is performed between the lateral circumflex vessels and the fibula vascular pedicle. Although the procedure is oftentimes successful in stabilizing the femoral head and providing blood flow to the femoral head, it carries the risk for donor sight morbidity. A bioadhesion can be used, combined with a drug and implanted into the femoral head. With the degradation of bioadhesion, the drug is gradually released, facilitating the regeneration of bones and veins.

Further, bioactive substance (e.g. drugs, growth factors, nucleic acids etc.) delivery is very important in the biomedical applications comprising tissue engineering, cell therapy and disease medical therapy. The materials for the delivery carriers must provide biocompatible and biodegradable properties for feasible implantation. Preferably, the material is a fluid ex vivo for easy mixing with drugs and transformation into a gel after being injected into the body by a syringe, catheter or laparoscope for delivering the bioactive substances to the desired tissue area. After, the drugs are released over time, achieving a therapeutic effect.

U.S. Pat. No. 5,514,380 discloses a biodegradable copolymer gel with controllable release profiles. The biodegradable copolymer gel, which is a multi-block copolymer, comprises hydrophilic polymer chains such as polyethyleneoxide (PEO) and hydrophobic polymer chains such as polylactic acid (PLA), polyglycolide acid (PGA), polylactide-glycolide (PLGA), or polycaprolactone (PCL). However, the patent makes no mention of temperature sensitivity of the biodegradable copolymer gel.

U.S. Pat. No. 5,702,717, U.S. Pat. No. 6,004,573, U.S. Pat. No. 6,117,949 and U.S. Pat. No. 6,117,949 disclose a temperature sensitive tri-block biodegradable copolymer, represented by ABA or BAB, wherein A is polyester and B is polyethylene glycol, with a average molecular weight of 2000-4990 g/mole. Due to the reverse thermal gelation properties of the biodegradable copolymer, when an aqueous composition including the biodegradable copolymer and a drug is heated (for example: when injected into a human body) over its gelation temperature, its viscosity increases and it transforms into a gel. Therefore, the drug release rate can be controlled by the in vivo hydrolysis rate of the gel. Further, the hydrolysate of the biodegradable copolymer has no cytotoxicity. However, the biodegradable copolymers have a lower critical solution temperature (LCST) of more than 37° C., and the patents do not provide examples proving that the biodegradable copolymers can serve as drug release rate controlling materials.

U.S. Pat. No. 6,136,333 discloses a block copolymer represented by AB or ABA, wherein A is polyester, and B is polyoxyalkylene. The AB di-block copolymer had an EO/LA ratio of between 0.1-100, wherein the cross-linking agent is hexamethylene diisocyanate (HMDI). The block copolymer can serve as anti-adhesion materials, but the patent makes no mention of temperature sensitivity of the block copolymer.

Currently, few delivery materials satisfy all requirements for body compatibility. For gels formed via chemical reactions, the activity of bioactive substances may be influenced to damage the implanted tissue. For materials that possess temperature-sensitivity and gelling property, they also possess poor biodegradability, so that they are not satisfactorily implanted inside of patients. There is, therefore, still a need for a low temperature sensitive and biodegradable copolymer that has no cytotoxicity after degradation.

BRIEF SUMMARY OF THE INVENTION

The biodegradable copolymer hydrogel of the invention comprises a two-phase block copolymer represented by A-B—BOX—B-A or B-A-B—BOX—B-A-B, wherein A is a hydrophilic block such as a hydrophilic polyethylene glycol polymer, B a hydrophobic block such as a hydrophobic polyester polymer, and BOX a bifunctional group monomer of 2,2'-Bis(2-oxazoline). The biodegradable copolymer hydrogel is prepared by cross-linking the di-block A-B or the tri-block B-A-B via ring-opening polymerization in presence of a bifunctional group monomer (2,2'-Bis(2-oxazoline)).

An exemplary embodiment of a biodegradable copolymer hydrogel includes a copolymer represented by Formula (I) of wherein, A comprises a hydrophilic polyethylene glycol polymer, B comprises a hydrophobic polyester polymer, and BOX is bifunctional group monomer of 2,2'-Bis(2-oxazoline) for coupling the di-blocks A-B.

Another exemplary embodiment of a biodegradable copolymer hydrogel includes a copolymer represented by Formula (II) of wherein, A comprises a hydrophilic polyethylene glycol polymer, B comprises a hydrophobic polyester polymer, BOX is bifunctional group monomer of 2,2'-Bis(2-oxazoline) for coupling the tri-blocks B-A-B, and n is an integer, equal to or greater than 0.

The hydrophilic polyethylene glycol polymer (A) can be polyethylene glycol polymer or methoxy-poly(ethylene glycol). The hydrophilic polyethylene glycol polymer (A) can have a molecular weight of 300-3000. Further, the hydrophobic polyester polymer (B) can be polymers or copolymers derived from D,L-Lactide, D-Lactide, L-Lactide, D,L-Lactic acid, D-Lactic acid, L-Lactic acid, glycolide, β-propiolactone, δ-valerolactone, or ε-caprolactone, such as poly(lactide-co-glycolide) (PLGA), poly(propionic-co-lactic (PPLA), poly(valeric-co-lactic) (PVLA), or poly(caproic-co-lactic) (PCLA). The hydrophobic polyester polymer (B) can have a molecular weight of 500-5000. For example, the hydrophobic polyester polymer (B) can be poly(lactide-co-glycolide) which is a copolymer by polymizing the poly (lactic acid) and poly(glycolide acid), wherein the poly(lactic acid) has a mole percent of 50-90 mol % and the poly(glycolide acid) a mole percent of 10-50 mol %, based on the total mole percent of poly(lactic acid) and poly(glycolide acid).

In an embodiment of the invention, one end of the hydrophobic polyester polymer (B) which is not bonded with the hydrophilic polyethylene glycol polymer (A) can have an end capping/coupling functional group, wherein the hydrophobic polyester polymer (B) is bonded with the BOX via the end capping/coupling functional group. The end capping/coupling functional group can be derived from an end capping/coupling agent, wherein the end capping/coupling agent comprises an anhydride such as succinic anhydride, maleic anhydride, phthalic anhydride, or sebacic anhydride.

The biodegradable copolymer hydrogel of the invention is water-soluble. In low added amounts, the biodegradable copolymer hydrogel is apt to form polymeric micelles. In high added amounts (more than 10 wt %), the biodegradable copolymer exhibits reverse thermal gelation properties and has a low critical solution temperature of 10-90° C., preferably 20-45° C. The biodegradable copolymer hydrogel behaves as a liquid with low viscosity below the critical solution temperature. After heating, the viscosity of the biodegradable copolymer hydrogen quickly rises, undergoing a reversible liquid-gel (or semi-solid) phase transition.

Further, the hydrophobic polyester polymer (B) of the biodegradable copolymer hydrogel is hydrolyzable. It should be noted that, after long-period degradation, the hydrolysate of the hydrophobic polyester polymer (B) is non-toxicity since the hydrolysate has a pH value of more than 5.0. The hydrophilic polyethylene glycol polymer (A) of the biodegradable copolymer hydrogel is also hydrolyzable and can be discharged harmlessly from the body through the urethra. In embodiments, the invention provides a biodegradable copolymer hydrogel with high temperature sensitivity, biodegradable properties, and no cytotoxicity after degradation.

The aqueous solution containing the biodegradable copolymer hydrogel is a mobile liquid ex vivo (room temperature), and a gel in vivo (or by heating). The biodegradable copolymer hydrogel is suitable to serve as a temperature sensitive hydrogel and can be applied for drug release, cells delivery, growth factors delivery, nucleic acids delivery, tissue engineering, repair of soft and hard tissues, or bioadhesion. Further, the biodegradable copolymer hydrogel can serve as a bioadhesion for adhering interfaces of cells, tissues, and implants, repair of soft and hard tissues, or implant fillers.

Moreover, the biodegradable copolymer hydrogel can be further mixed with a biological activity compound, ceramics, polymer, or metal and serve as a carrier of an injection, pastille, powder, gel or oral liquid.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following examples are intended to illustrate the invention more fully without limiting the scope of the invention, since numerous modifications and variations will be apparent to those skilled in this art.

Preparation of Biodegradable Copolymer Hydrogel

Example 1

A glass reactor (250 ml volume) connecting with a condenser, a heater, and a thermostat was provided, wherein educts of the condenser wrapped with heating tape looped back and rejoined to the reactor. 10.04 g of mPEG (methoxy poly(ethylene glycol) (with a molecular weight of 550 g/mole), 20 g of lactide and 5.64 g of glycolide were added in the reactor, and the temperature was elevated slowly for complete dissolution. When the temperature reached and was sustained at 160° C., 14.0 μl of catalyst (stannous 2-ethylhexanoate) was added. After stirring for 8 hrs, the mPEG-PLGA di-block was obtained.

Next, 1.84 g of succinic anhydride (with a molecular weight of 100.07 g/mole) was added into the reactor. After stirring for 4 hrs, 1.28 g of 2,2'-Bis(2-oxazoline) (with a molecular weight of 140.14 g/mole) was added into the reactor. After completely melting the mixture, stannous octoate as a catalyst was added into the reactor. After polymerizing for 4 hrs, the product was precipitated with diethyl ether/n-hexane (v/v=1/9) to form a translucent colloid. The residual monomers were washed three times and dried in a vacuum for 24 hrs at a temperature of 40° C., thus obtaining a biodegradable copolymer hydrogel (A) (the mPEG-PLGA di-block cross-linking by 2,2'-Bis(2-oxazoline)). Preparation procedure of the biodegradable copolymer hydrogel (A) is shown as below:

$n>1$, $X>1$, $Y>1$

Figure 1:
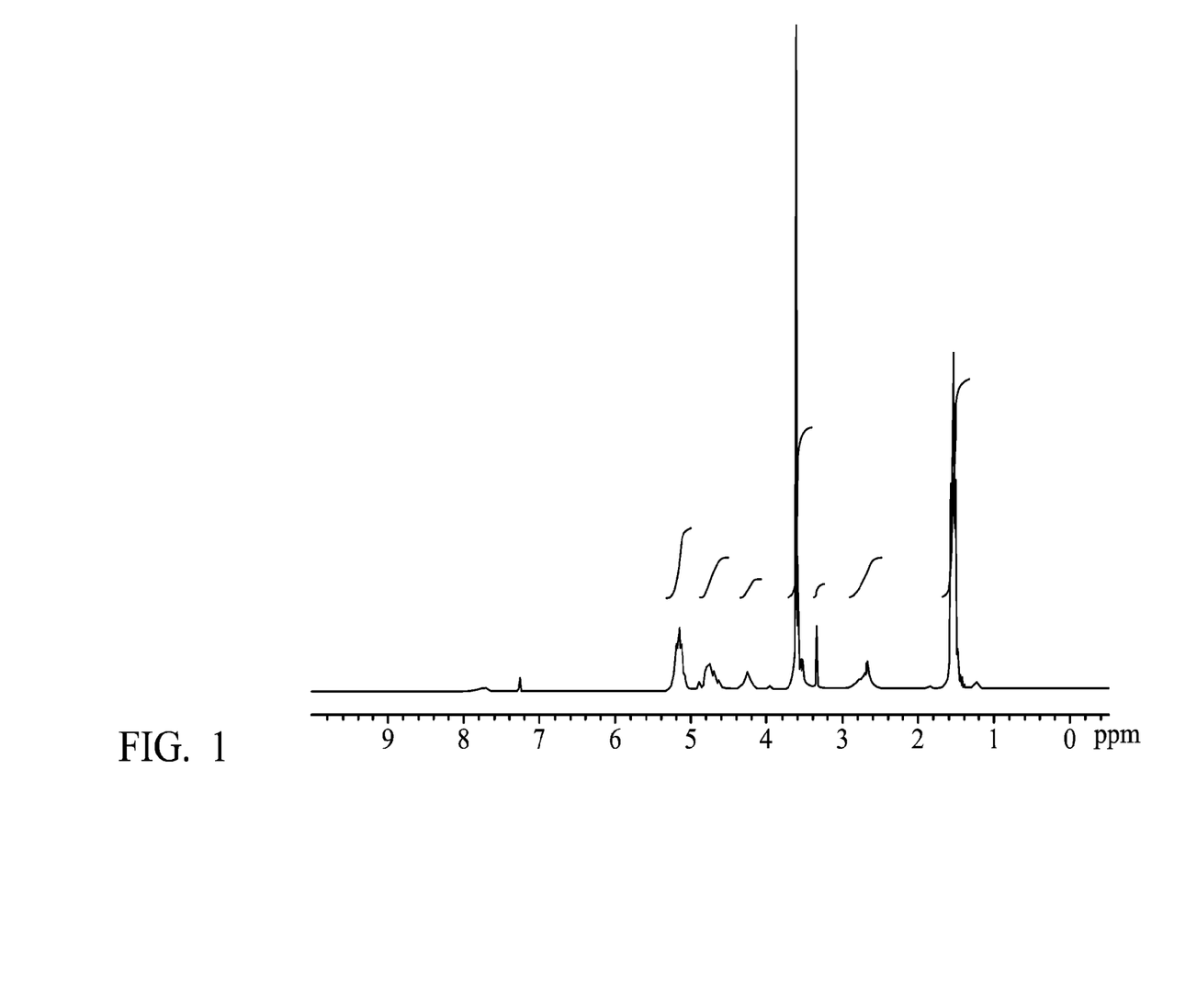
FIG. 1 shows a $^1$H NMR spectrum of biodegradable copolymer hydrogel (A) disclosed in Example 1 of the invention.

The molecule weight of the biodegradable copolymer hydrogel (A) was determined with a GPC, as shown in Table 1. The molecular configuration of the biodegradable copolymer hydrogel (A) was determined with an NMR, as shown in FIG. 1.

The biodegradable copolymer hydrogel (A) exhibited high temperature sensitivity. After measuring with a UV transmittancy test, the results showed the biodegradable copolymer hydrogel (A) was a transparent liquid under low temperature, a translucent viscous liquid at a temperature of 25° C., and an opaque immobile gel at a temperature of 40° C.

Example 2

A glass reactor (250 ml volume) connecting with a condenser, a heater, and a thermostat was provided, wherein educts of the condenser wrapped with heating tape looped back and rejoined to the reactor. 11.18 g of mPEG (methoxy poly(ethylene glycol) (with a molecular weight of 550 g/mole), 20 g of lactide and 8.57 g of valerolactone were added in the reactor, and the temperature was elevated slowly for complete dissolution. When the temperature reached and was sustained at 160° C., 16.0 μl of catalyst (stannous 2-ethylhexanoate) was added. After stirring for 8 hrs, the mPEG-PVLA di-block was obtained.

Next, 2.45 g of succinic anhydride (with a molecular weight of 100.07 g/mole) was added into the reactor. After stirring for 4 hrs, 1.71 g of 2,2'-Bis(2-oxazoline) (with a molecular weight of 140.14 g/mole) was added into the reactor. After completely melting the mixture, stannous octoate as a catalyst was added into the reactor. After polymerizing for 4 hrs, the product was precipitated with diethyl ether/n-hexane (v/v=1/9) to form a translucent colloid. The residual monomers were washed three times and dried in a vacuum for 24 hrs at a temperature of 40° C., thus obtaining a biodegradable copolymer hydrogel (B) (mPEG-PVLA di-block cross-linking by 2,2'-Bis(2-oxazoline)). Preparation procedure of the biodegradable copolymer hydrogel (B) is shown as below:

mPEG-PVLA-SA-BOX-SA-PVLA-mPEG
biodegradable copolymer hydrogel (B)

n>1, X>1, Y>1

Figure 2:
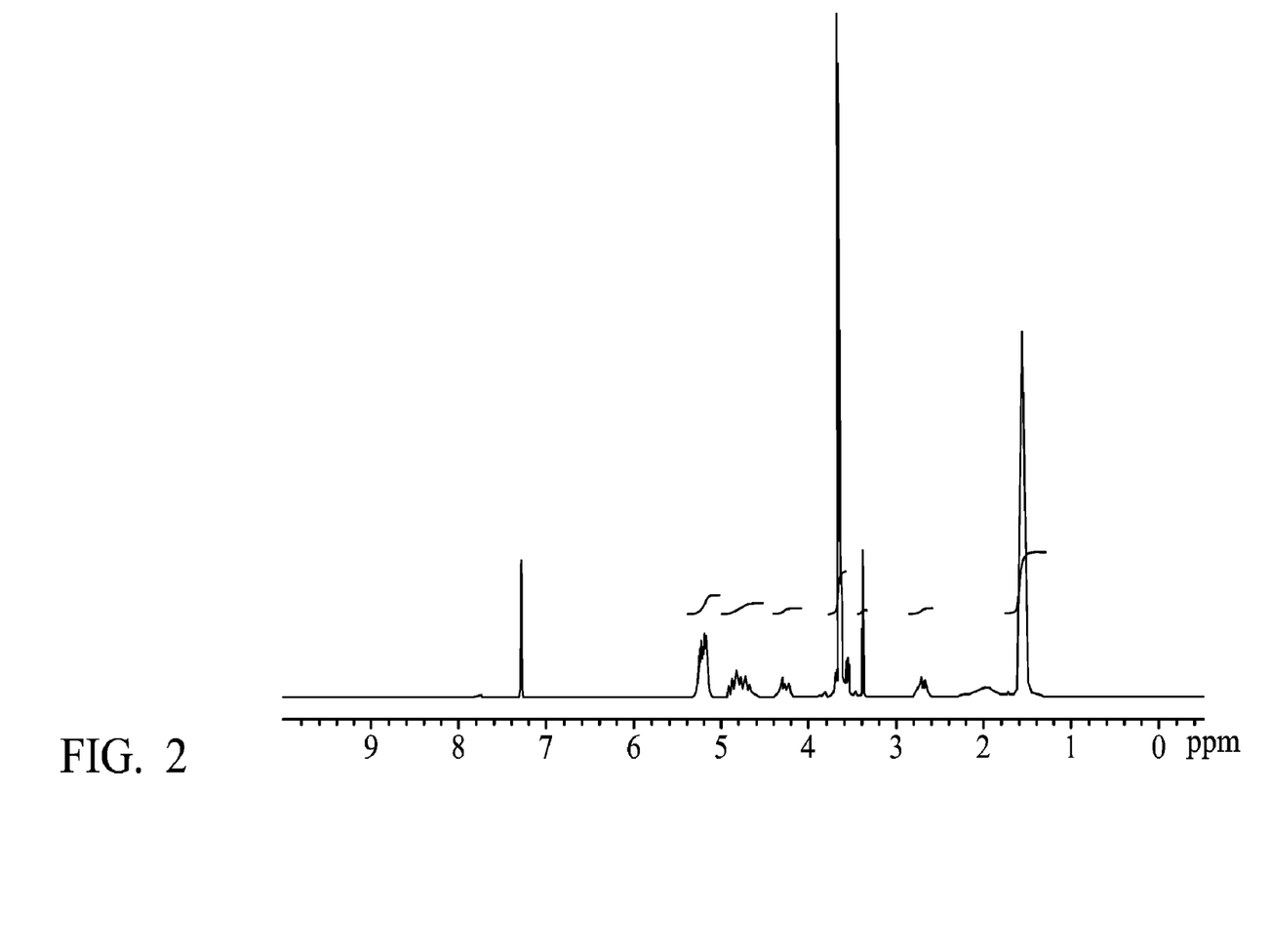
FIG. 2 shows a $^1$H NMR spectrum of biodegradable copolymer hydrogel (B) disclosed in Example 2 of the invention.

The molecule weight of the biodegradable copolymer hydrogel (B) was determined by a GPC, as shown in Table 1. The molecular configuration of the biodegradable copolymer hydrogel (B) was determined by an NMR, as shown in FIG. 2.

Example 3

A glass reactor (250 ml volume) connecting with a condenser, a heater, and a thermostat was provided, wherein educts of the condenser wrapped with heating tape looped back and rejoined to the reactor. 12.01 g of PEG (poly(ethylene glycol)) (with a molecular weight of 1000 g/mole), 25 g of lactide and 5.68 g of glycolide were added in the reactor, and the temperature was elevated slowly for complete dissolution. When the temperature reached and was sustained at 160° C., 17.07 µl of catalyst (stannous 2-ethyl-hexanoate) was added. After stirring for 8 hrs, the PLGA-PEG-PLGA tri-block was obtained.

Next, 4.81 g of succinic anhydride (with a molecular weight of 100.07 g/mole) was added into the reactor. After stirring for 4 hrs, 3.06 g of 2,2'-Bis(2-oxazoline) (with a molecular weight of 140.14 g/mole) was added into the reactor. After completely melting the mixture, stannous octoate as a catalyst was added into the reactor. After polymerizing for 4 hrs, the product was precipitated with diethyl ether/n-hexane (v/v=1/9) to form a translucent colloid. The residual monomers were washed three times and dried in a vacuum for 24 hr at a temperature of 40° C., thus obtaining a biodegradable copolymer hydrogel (C) (the PLGA-PEG-PLGA tri-block cross-linking by 2,2'-Bis(2-oxazoline)). Preparation procedure of the biodegradable copolymer hydrogel (C) is shown as below:

SA-PLGA-PEG-PLGA-SA-BOX-SA-PLGA-PEG-PLGA-SA
biodegradable copolymer hydrogel (C)

n>1, X>1, Y>1

Figure 3:
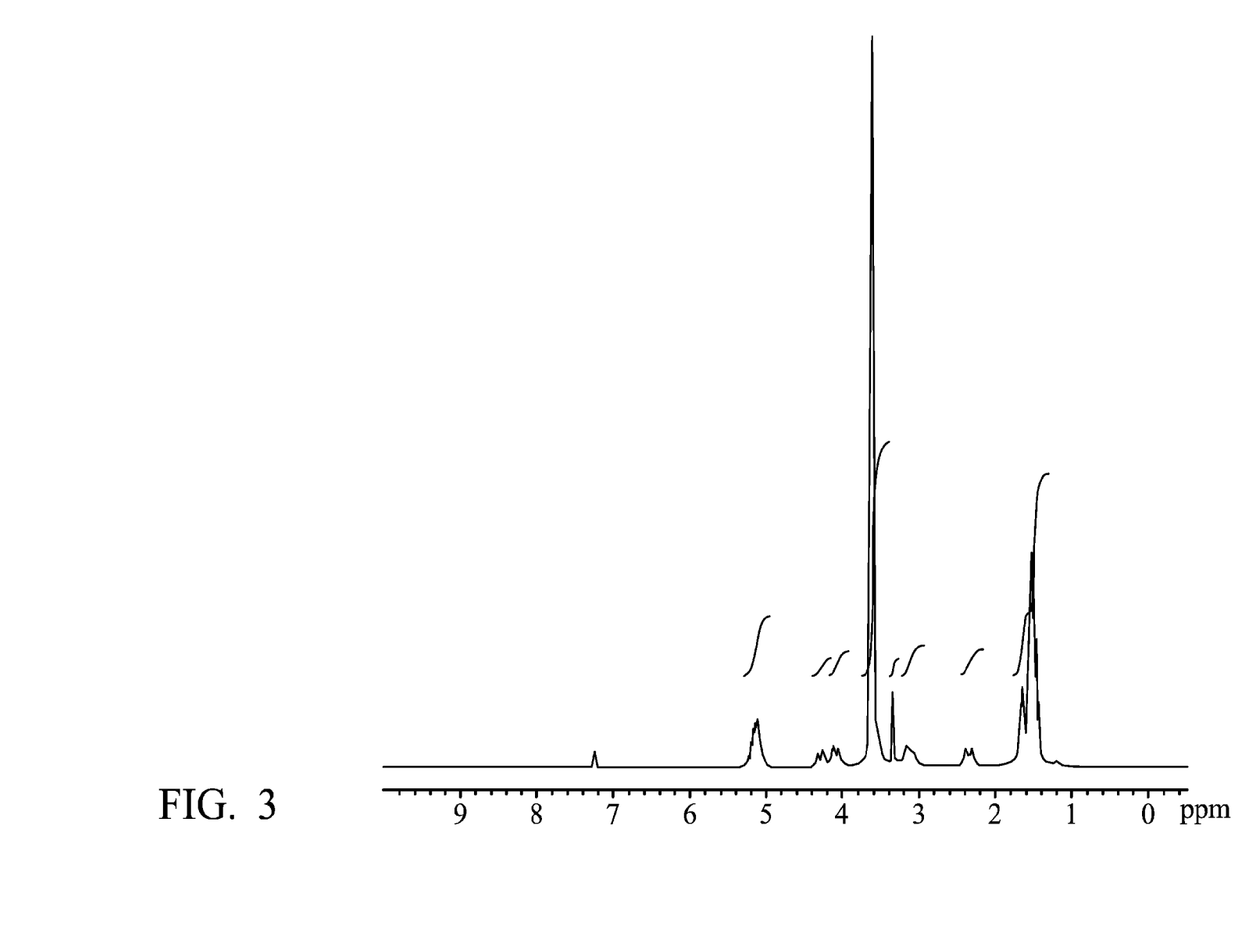
FIG. 3 shows a $^1$H NMR spectrum of biodegradable copolymer hydrogel (C) disclosed in Example 3 of the invention.

The molecule weight of the biodegradable copolymer hydrogel (C) was determined by a GPC, as shown in Table 1. The molecular configuration of the biodegradable copolymer hydrogel (C) was determined by an NMR, as shown in FIG. 3.

The biodegradable copolymer hydrogel (C) exhibited high temperature sensitivity. After measuring by a UV transmittancy test, the results showed that the biodegradable copolymer hydrogel (A) was a transparent liquid under low temperature, a translucent viscous liquid at a temperature of 25° C., and an opaque immobile gel at a temperature of 40° C.

Example 4

A glass reactor (250 ml volume) connecting with a condenser, a heater, and a thermostat was provided, wherein educts of the condenser wrapped with heating tape looped back and rejoined to the reactor. 25 g of PEG (poly(ethylene glycol)) (with a molecular weight of 1000 g/mole), 25 g of lactide and 10.71 g of valerolactone were added in the reactor, and the temperature was elevated slowly for complete dissolution. When the temperature reached and was sustained at 160° C., 17.53 μl of catalyst (stannous 2-ethyl-hexanoate) was added. After stirring for 8 hrs, the PVLA-PEG-PVLA tri-block was obtained.

Next, 1.78 g of succinic anhydride (with a molecular weight of 100.07 g/mole) was added into the reactor. After stirring for 4 hrs, 1.14 g of 2,2'-Bis(2-oxazoline) (with a molecular weight of 140.14 g/mole) was added into the reactor. After completely melting the mixture, stannous octoate as a catalyst was added into the reactor. After polymerizing for 4 hrs, the product was precipitated with diethyl ether/n-hexane (v/v=1/9) to form a translucent colloid. The residual monomers were washed three times and dried in a vacuum for 24 hrs at a temperature of 40° C., thus obtaining a biodegradable copolymer hydrogel (D) (PVLA-PEG-PVLA tri-block crosslinking by 2,2'-Bis(2-oxazoline)). Preparation procedure of the biodegradable copolymer hydrogel (D) is shown as below:

n>1, X>1, Y>1

Figure 4:
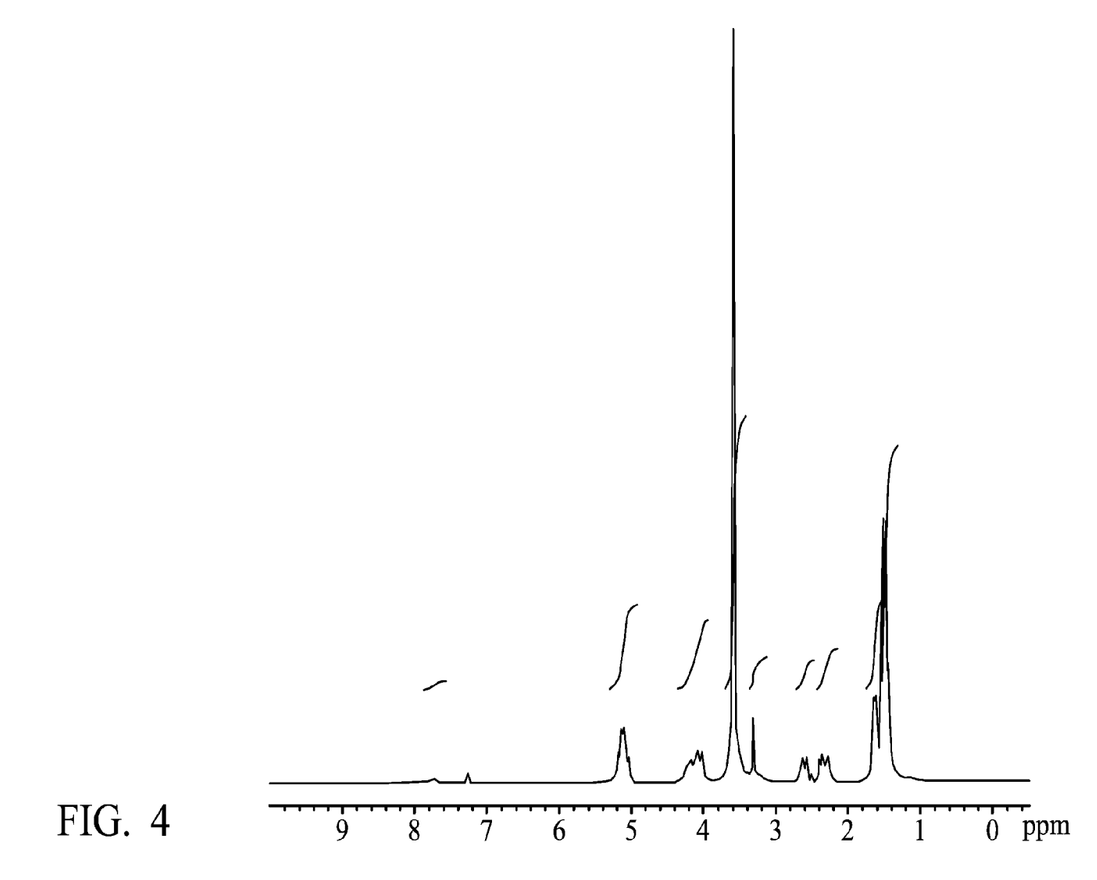
FIG. 4 shows a $^1$H NMR spectrum of biodegradable copolymer hydrogel (D) disclosed in Example 4 of the invention.

The molecule weight of the biodegradable copolymer hydrogel (D) was determined by a GPC, as shown in Table 1. The molecular configuration of the biodegradable copolymer hydrogel (D) was determined by an NMR, as shown in FIG. 4.

TABLE 1

| Example | sample | Mw(g/mol) | Mw/Mn |
|---------|--------|-----------|-------|
| 1 | biodegradable copolymer hydrogel (A) | 3917 | 1.46 |
| 2 | biodegradable copolymer hydrogel (B) | 4143 | 1.36 |
| 3 | biodegradable copolymer hydrogel (C) | 9401 | 1.23 |
| 4 | biodegradable copolymer hydrogel (D) | 8925 | 1.37 |

TABLE 1-continued

Comparative Example 1

A glass reactor (250 ml volume) connecting with a condenser, a heater, and a thermostat was provided, wherein educts of the condenser wrapped with heating tape looped back and rejoined to the reactor. 14.24 g of mPEG (methoxy poly(ethylene glycol) (with a molecular weight of 550 g/mole), 25 g of lactide and 11.40 g of glycolide were added in the reactor, and the temperature was elevated slowly for complete dissolution. When the temperature reached and was sustained at 160° C., 20.24 μl of catalyst (stannous 2-ethyl-hexanoate) was added. After stirring for 8 hrs, the mPEG-PLGA di-block was obtained. Preparation procedure of Comparative Example 1 is shown as below:

n>1, X>1, Y>1

Comparative Example 2

A glass reactor (250 ml volume) connecting with a condenser, a heater, and a thermostat was provided, wherein educts of the condenser wrapped with heating tape looped back and rejoined to the reactor. 7.12 g of PEG (poly(ethylene glycol) (with a molecular weight of 1000 g/mole), 25 g of lactide and 11.36 g of glycolide were added in the reactor, and the temperature was elevated slowly for complete dissolution. When the temperature reached and was sustained at 160° C., 17.4 μl of catalyst (stannous 2-ethyl-hexanoate) was added. After stirring for 8 hrs, the PLGA-PEG-PLGA tri-block was obtained. Preparation procedure of Comparative Example 2 is shown as below:

PLGA-PEG-PLGA tri-block copolymer n>1, X>1, Y>1

Measurement of Lower Critical Solution Temperature (LCST)

The biodegradable copolymer hydrogels (A)-(D) disclosed in Examples 1-4, the mPEG-PLGA di-block copolymer disclosed in Comparative Example 1 and the PLGA-PEG-PLGA tri-block copolymer disclosed in Comparative Example 2 were respectively measured by a lower critical solution temperature (LCST) test. The results are shown in Table 2.

TABLE 2

| Example | Sample | LCST(° C.) |
| --- | --- | --- |
| Example 1 | biodegradable copolymer hydrogel (A) | 42.56 |
| Example 2 | biodegradable copolymer hydrogel (B) | 41.25 |
| Example 3 | biodegradable copolymer hydrogel (C) | 73.32 |
| Example 4 | biodegradable copolymer hydrogel (D) | 43.79 |
| Comparative Example 1 | mPEG-PLGA di-block | 25.09 |
| Comparative Example 2 | PLGA-PEG-PLGA tri-block | 35.41 |

As shown in Table 2, the biodegradable copolymer hydrogel (A) (the mPEG-PLGA di-block cross-linking by BOX) had an LCST of over 15° C. higher than that of the mPEG-PLGA di-block copolymer (as disclosed in Comparative Example 1); and the biodegradable copolymer hydrogel (C) (the PLGA-PEG-PLGA tri-block cross-linking by BOX) had an LCST of over 37° C. higher than that of the PLGA-PEG-PLGA tri-block copolymer (as disclosed in Comparative Example 2).

Measurement of Phase Transition Diagram

Figure 5:
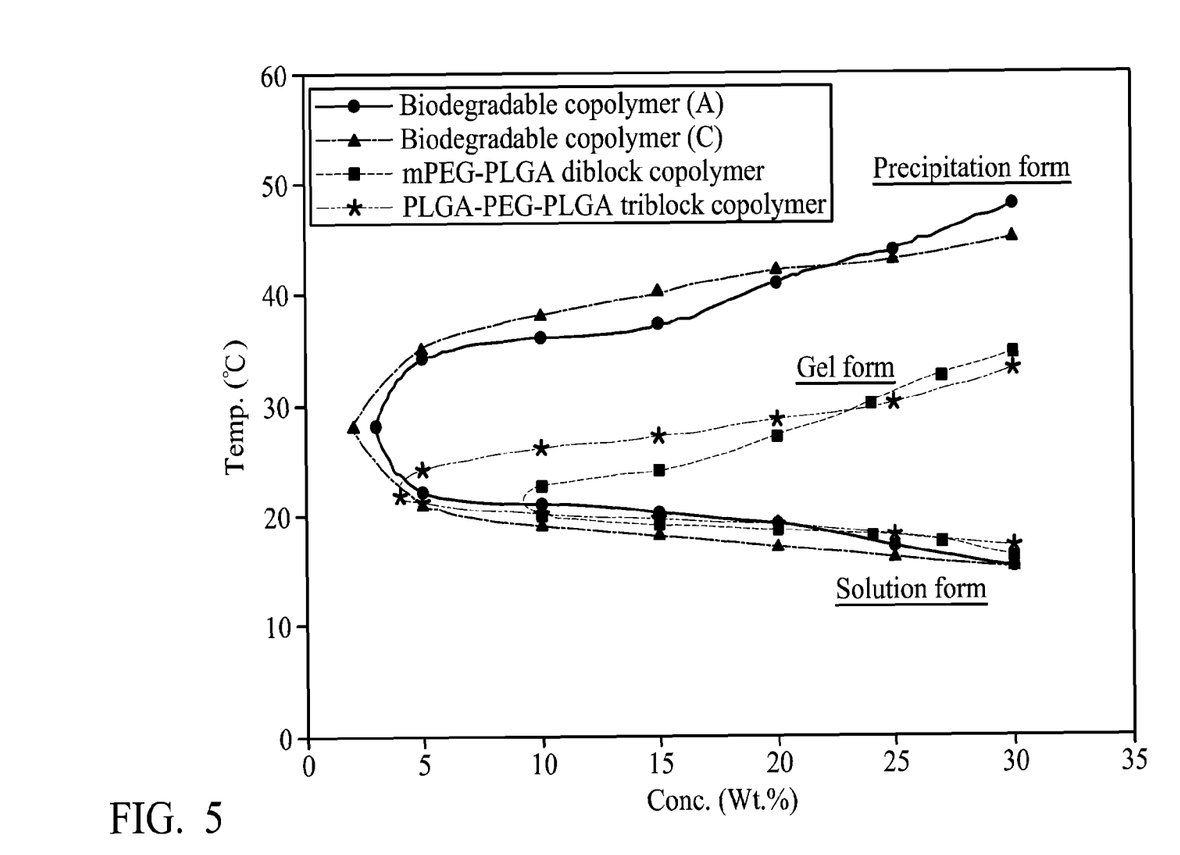
FIG. 5 shows the phase transition diagrams of the biodegradable copolymer hydrogels (A), (C) disclosed in Examples 1, and 3 mPEG-PLGA di-block copolymer disclosed in Comparative Example 1 and PLGA-PEG-PLGA tri-block copolymer disclosed in Comparative Example 2.

The phase transition diagrams of the biodegradable copolymer hydrogels (A) and (C) disclosed in Examples 1 and 3, the mPEG-PLGA di-block copolymer disclosed in Comparative Example 1 and the PLGA-PEG-PLGA tri-block copolymer disclosed in Comparative Example 2 were respectively measured, as shown in FIG. 5. The measurement steps included: preparing a plurality of copolymer hydrogels (A)-(C) and block copolymers of Comparative Examples 1-2 with a copolymer concentration of between 3-30%, and then observing respectively the viscosity thereof, from a temperature of 10° C. to 60° C.

The term "gel form" means the sample cannot instantly flow, and the term "precipitation form" means water is exhausted from the sample and liquid form and a gel form coexist in the sample (analogous precipitation).

As shown in FIG. 5, the biodegradable copolymer hydrogels (A)-(C) sharply undergoes a phase change from solution form to precipitation form when heated at temperature of over 30° C. Further, the temperature difference between the solution form and the precipitation form was larger than 10° C., for copolymer concentrations of 5 wt % and larger than 25° C. for copolymer concentrations of 30 wt %. To the contrary, the conventional mPEG-PLGA di-block copolymer and the PLGA-PEG-PLGA tri-block copolymer undergo a phase change from solution form to gel form when heated at a temperature of 23° C. The temperature difference between the solution form and the precipitation form was a mere 2-3° C. for copolymer concentrations of 5 wt % and 12-14° C. for copolymer concentrations of 30 wt %.

Measurement of Swelling Ratio

The biodegradable copolymer hydrogels (A)-(D) disclosed in Examples 1-4, the mPEG-PLGA di-block copolymer disclosed in Comparative Example 1 and the PLGA-PEG-PLGA tri-block copolymer disclosed in Comparative Example 2 were respectively measured to determine the swelling ratio thereof. The swelling ratio test includes: mixing the hydrogel or copolymer with deionized water to prepare a solution (concentration 15 wt %), adding 3 ml of the solution into a centrifuge tube (4 ml volume), gradually heating the tube from a temperature of 10° C. to 50° C., and measuring the height of the solution at every 5° C. temperature increase increment.

The swelling ratio equation used is as follows:

$$\text{swelling ratio}(H/H) = (Hw - Hd)/Hd * 100$$

(Hd: original height; and Hw: swelling height)

Figure 6:
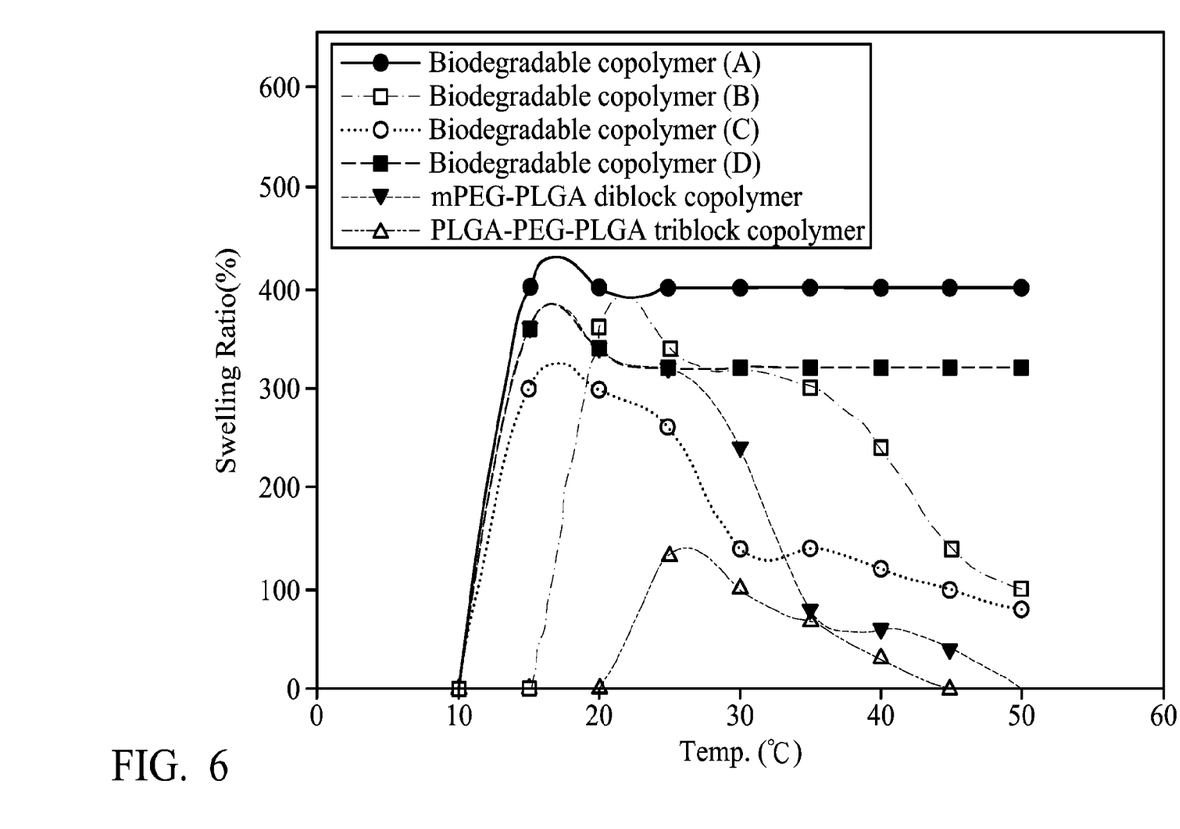
FIG. 6 shows a graph plotting swelling ratio against temperature for the biodegradable copolymer hydrogels (A)-(D) disclosed in Examples 1-4 the mPEG-PLGA di-block copolymer disclosed in Comparative Example 1 and the PLGA-PEG-PLGA tri-block copolymer disclosed in Comparative Example 2.

The results are shown in FIG. 6. The swelling ratio variation of the biodegradable copolymer hydrogels (A)-(D) occurred for temperatures between 20-50° C.

Test of Degradation

The degradation of the biodegradable copolymer hydrogels (A)-(D) disclosed in Examples 1-4, the mPEG-PLGA di-block copolymer disclosed in Comparative Example 1 and the PLGA-PEG-PLGA tri-block copolymer disclosed in Comparative Example 2 were estimated by the method as below.

The hydrogels or copolymers were respectively mixed with a phosphate buffer saline (PBS) to fabricate a test aqueous solution with a copolymer concentration of 20 wt %. Next, the test aqueous solution was put into an individual air-tight vial with 15 ml of phosphate buffer saline (PBS). Next, the vials were stirred with a speed of 50 rpm at a temperature of 37° C. Following, the vials were allowed to stand still, and on the 1st, 3rd, 5th, 7th, 9th, 14th, 16th, 20th, and 28th days, the upper layer solution of the vial was poured away. The remaining solid was washed 1-2 times by deionized water. After removing excess water by a freeze-drying process (at −20° C.), the remaining hydrogels or copolymers were weighed respectively.

The degradation ratio equation used was as follows:

degradation ratio($w/w$)=$Wd/Wo$*100

(Wd: weight after degradation; and Wo: weight before degradation)

Figure 7:
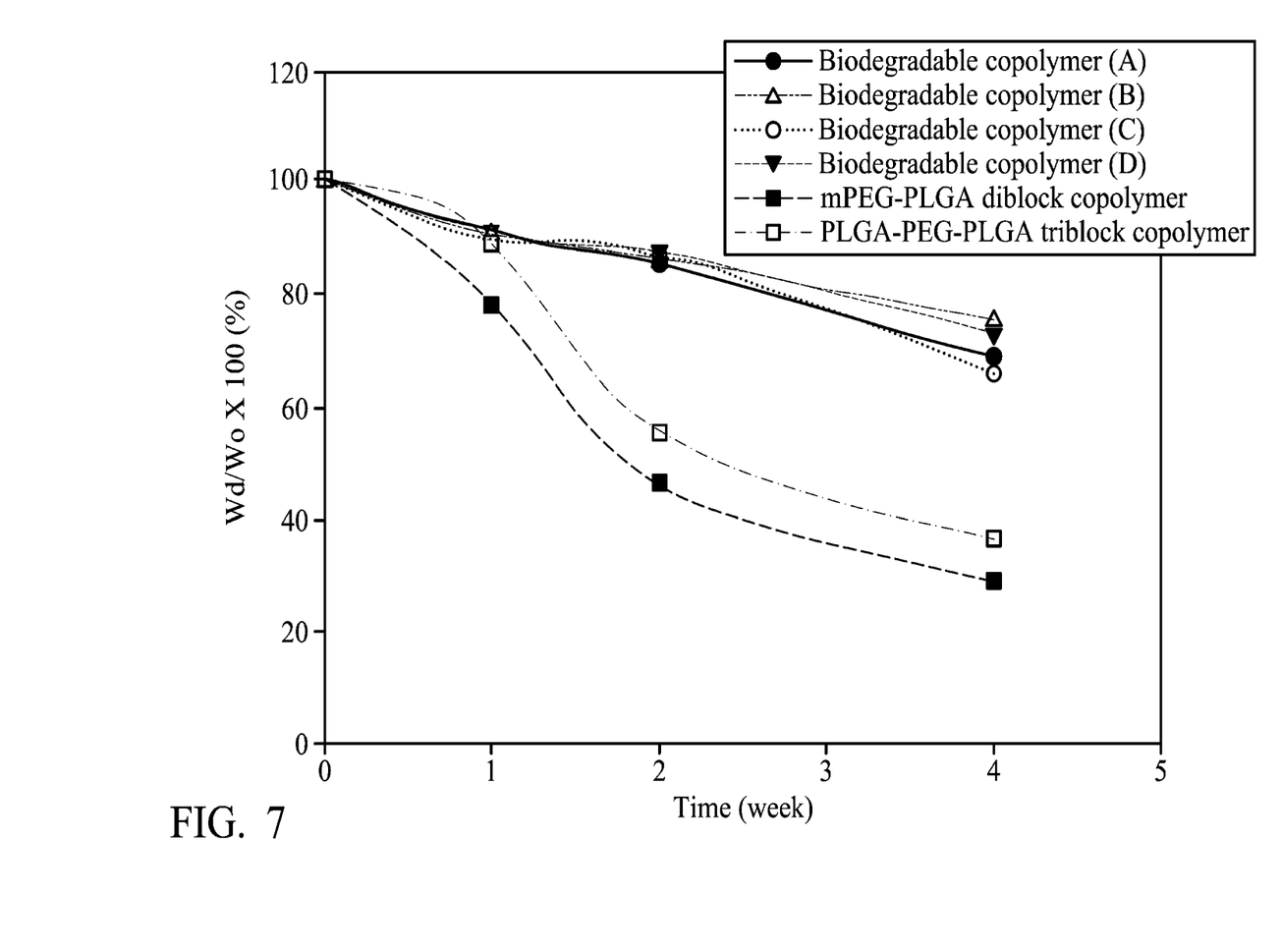
FIG. 7 shows a graph plotting degradation ratio against time for the biodegradable copolymer hydrogels (A)-(D) disclosed in Examples 1-4, the mPEG-PLGA di-block copolymer disclosed in Comparative Example 1 and the PLGA-PEG-PLGA tri-block copolymer disclosed in Comparative Example 2.

The relationship between the degradation ratio changes of each test aqueous solution and time allowed to stand still is shown in FIG. 7. As shown in FIG. 7, the biodegradable copolymer hydrogels (A)-(D) had longer degradation periods.

Further, after 4 weeks of degradation, the pH values of the biodegradable copolymer hydrogels (A) and (C) disclosed in Examples 1 and 3, the mPEG-PLGA di-block copolymer disclosed in Comparative Example 1 and the PLGA-PEG-PLGA tri-block copolymer were measured. The results are shown in Table 3.

TABLE 3

| Example | Sample | pH |
|---|---|---|
| Example 1 | biodegradable copolymer hydrogel (A) | >5.2 |
| Example 3 | biodegradable copolymer hydrogel (C) | >5.2 |
| Comparative Example 1 | mPEG-PLGA di-block copolymer | <4.0 |
| Comparative Example 2 | PLGA-PEG-PLGA tri-block copolymer | <4.0 |

The degradation products of the hydrophobic polyester polymer (B) had a pH value of more than 5.0.

As shown in Table 3, the degradation products of the biodegradable copolymer hydrogels of the invention had a pH value of more than 5.0. However, the degradation products of the mPEG-PLGA di-block copolymer and the PLGA-PEG-PLGA tri-block copolymer had a pH value of less than 5.0.

Cytotoxicity Analysis

The cytotoxicities of the biodegradable copolymer hydrogels (A), and (C) disclosed in Examples 1, and 3, the mPEG-PLGA di-block copolymer disclosed in Comparative Example 1 and the PLGA-PEG-PLGA tri-block copolymer disclosed in Comparative Example 2 were estimated. Cytotoxicity was measured by the method described in ASTM F-895 "Standard Test Method for Agar Diffusion Cell Culture for Cytotoxicity". The results are shown in Table 4.

TABLE 4

| Sample | Response index (zone index/lysis index) |
|---|---|
| Before degradation | |
| biodegradable copolymer hydrogel (A) | 0/0 |
| biodegradable copolymer hydrogel (C) | 0/0 |
| mPEG-PLGA di-block copolymer | 0/0 |
| PLGA-PEG-PLGA tri-block copolymer | 0/0 |
| Negative control (Latex Rubber) | 5/5 |
| Positive control (Teflon) | 0/0 |
| After degradation for 4 weeks | |
| biodegradable copolymer hydrogel (A) | 0/0 |
| biodegradable copolymer hydrogel (C) | 0/0 |
| mPEG-PLGA di-block copolymer | 4/3 |
| PLGA-PEG-PLGA tri-block copolymer | 4/4 |
| Negative control (Latex Rubber) | 5/5 |
| Positive control (Teflon) | 0/0 |

As shown in Table 4, the conventional mPEG-PLGA di-block copolymer or the PLGA-PEG-PLGA tri-block copolymer exhibited cytotoxicity after degradation. To the contrary, the biodegradable copolymer hydrogels of the invention exhibited no cytotoxicity before and after degradation.

Accordingly, the biodegradable copolymer hydrogel of the invention has the following advantages in comparison with conventional biohydrogels:

1. The biodegradable copolymer hydrogel has a pH value of more than 5.0 after long degradation;

2. The biodegradable copolymer hydrogel has high moisture retention (resulting in high gel phase temperature);

3. The biodegradable copolymer hydrogel has wider lower critical solution temperature (LCST) in comparison with conventional biohydrogels; and 4. The biodegradable copolymer hydrogel has no cytotoxicity after degradation.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A biodegradable copolymer hydrogel, comprising a copolymer represented by Formula (I):

A-B—BOX—B-A, wherein A comprises a hydrophilic polyethylene glycol polymer, B comprises a hydrophobic polyester polymer, and BOX comprises a bifunctional group monomer of 2,2'-Bis(2-oxazoline) for coupling the di-blocks A-B, wherein the hydrophobic polyester polymer (B) has a molecular weight of 500-5000 Da.

2. The biodegradable copolymer hydrogel as claimed in claim 1, wherein an end of the hydrophobic polyester polymer (B) which is not bonded with the hydrophilic polyethylene glycol polymer (A) has an end capping/coupling functional group.

3. The biodegradable copolymer hydrogel as claimed in claim 2, wherein the hydrophobic polyester polymer (B) is bonded with the BOX via the end capping/coupling functional group.

4. The biodegradable copolymer hydrogel as claimed in claim 2, wherein the end capping/coupling functional group is derived from an end capping/coupling agent, and the end capping/coupling agent comprises an anhydride.

5. The biodegradable copolymer hydrogel as claimed in claim 4, wherein the end capping/coupling agent comprises succinic anhydride, maleic anhydride, phthalic anhydride, or sebacic anhydride.

6. The biodegradable copolymer hydrogel as claimed in claim 1, wherein the hydrophilic polyethylene glycol polymer (A) comprises methoxy-poly(ethylene glycol) (mPEG).

7. The biodegradable copolymer hydrogel as claimed in claim 1, wherein the hydrophilic polyethylene glycol polymer (A) has a molecular weight of 300-3000 Da.

8. The biodegradable copolymer hydrogel as claimed in claim 1, wherein the hydrophobic polyester polymer (B) comprises polymers or copolymers derived from D,L-Lactide, D-Lactide, L-Lactide, D,L-Lactic acid, D-Lactic acid, L-Lactic acid, glycolide, β-propiolactone, δ-valerolactone, or ε-caprolactone.

9. The biodegradable copolymer hydrogel as claimed in claim 1, wherein the hydrophobic polyester polymer (B) comprises poly(lactide-co-glycolide) (PLGA), poly(propionic-co-lactic (PPLA), poly(valeric-co-lactic) (PVLA), or poly(caproic-co-lactic) (PCLA).

10. The biodegradable copolymer hydrogel as claimed in claim 1, wherein the hydrophobic polyester polymer (B) comprises the copolymer of poly(lactic acid) (PLA) and poly(glycolide acid) (PGA).

11. The biodegradable copolymer hydrogel as claimed in claim 10, wherein the poly(lactic acid) has a mole percent of 50-90 mol %, based on the total mole percent of poly(lactic acid) and poly(glycolide acid).

12. The biodegradable copolymer hydrogel as claimed in claim 10, wherein the poly(glycolide acid) has a mole percent of 10-50 mol %, based on the total mole percent of poly(lactic acid) and poly(glycolide acid).

13. The biodegradable copolymer hydrogel as claimed in claim 1, wherein the di-block A-B is reacted with 2,2'-Bis(2-oxazoline) via ring-opening polymerization to form the copolymer represented by Formula (I).

14. The biodegradable copolymer hydrogel as claimed in claim 1, wherein the biodegradable copolymer hydrogel has no cytotoxicity after degradation.

15. The biodegradable copolymer hydrogel as claimed in claim 1, wherein the biodegradable copolymer hydrogel has a low critical solution temperature (LCST) of 10-90° C.

16. The biodegradable copolymer hydrogel as claimed in claim 1, wherein the biodegradable copolymer hydrogel is applied for drug release, cells delivery, growth factors delivery, nucleic acids delivery, tissue engineering, repair of soft and hard tissues, or bioadhesion.

17. The biodegradable copolymer hydrogel as claimed in claim 16, wherein the biodegradable copolymer hydrogel serves as a bioadhesion for adhering interfaces of cells, tissues, and implants, repair of soft and hard tissues, or implant fillers.

18. The biodegradable copolymer hydrogel as claimed in claim 1, wherein the biodegradable copolymer hydrogel is further mixed with a biological activity compound, ceramics, polymer, or metal.

19. The biodegradable copolymer hydrogel as claimed in claim 1, wherein the biodegradable copolymer hydrogel serves as a carrier of an injection, pastille, powder, gel or oral liquid.

20. A biodegradable copolymer hydrogel, comprising a copolymer represented by Formula (II) of B-A-B—(BOX—B-A-B)$n$-BOX—B-A-B, wherein A comprises a hydrophilic polyethylene glycol polymer, B comprises a hydrophobic polyester polymer, BOX comprises a bifunctional group monomer of 2,2'-Bis(2-oxazoline) for coupling the tri-blocks B-A-B, and n is an integer, equal to or greater than 0, wherein the hydrophobic polyester polymer (B) has a molecular weight of 500-5000 Da.

21. The biodegradable copolymer hydrogel as claimed in claim 20, wherein an end of the hydrophobic polyester polymer (B) which is not bonded with the hydrophilic polyethylene glycol polymer (A) has an end capping/coupling functional group.

22. The biodegradable copolymer hydrogel as claimed in claim 21, wherein the hydrophobic polyester polymer (B) is bonded with the BOX via the end capping/coupling functional group.

23. The biodegradable copolymer hydrogel as claimed in claim 21, wherein the end capping/coupling functional group is derived from an end capping/coupling agent, wherein the end capping/coupling agent comprises an anhydride.

24. The biodegradable copolymer hydrogel as claimed in claim 23, wherein the end capping/coupling agent comprises succinic anhydride, maleic anhydride, phthalic anhydride, or sebacic anhydride.

25. The biodegradable copolymer hydrogel as claimed in claim 20, wherein the hydrophilic polyethylene glycol polymer (A) comprises poly(ethylene glycol) (PEG).

26. The biodegradable copolymer hydrogel as claimed in claim 20, wherein the hydrophilic polyethylene glycol polymer (A) has a molecular weight of 300-3000 Da.

27. The biodegradable copolymer hydrogel as claimed in claim 20, wherein the hydrophobic polyester polymer (B) comprises polymers or copolymers derived from D,L-Lactide, D-Lactide, L-Lactide, D,L-Lactic acid, D-Lactic acid, L-Lactic acid, glycolide, β-propiolactone, δ-valerolactone, or ε-caprolactone.

28. The biodegradable copolymer hydrogel as claimed in claim 20, wherein the hydrophobic polyester polymer (B) comprises poly(lactide-co-glycolide) (PLGA), poly(propionic-co-lactic (PPLA), poly(valeric-co-lactic) (PVLA), or poly(caproic-co-lactic) (PCLA).

29. The biodegradable copolymer hydrogel as claimed in claim 20, wherein the hydrophobic polyester polymer (B) comprises the copolymer of poly(lactic acid) (PLA) and poly(glycolide acid) (PGA).

30. The biodegradable copolymer hydrogel as claimed in claim 29, wherein the poly(lactic acid) has a mole percent of 50-90 mol %, based on the total mole percent of poly(lactic acid) and poly(glycolide acid).

31. The biodegradable copolymer hydrogel as claimed in claim 29, wherein the poly(glycolide acid) has a mole percent of 10-50 mol %, based on the total mole percent of poly(lactic acid) and poly(glycolide acid).

32. The biodegradable copolymer hydrogel as claimed in claim 29, wherein the tri-block B-A-B is reacted with 2,2'-Bis(2-oxazoline) via ring-opening polymerization to form the copolymer represented by Formula (II).

33. The biodegradable copolymer hydrogel as claimed in claim 20, wherein the biodegradable copolymer hydrogel has no cytotoxicity after degradation.

34. The biodegradable copolymer hydrogel as claimed in claim 20, wherein the biodegradable copolymer hydrogel has a low critical solution temperature (LCST) of 10-90° C.

35. The biodegradable copolymer hydrogel as claimed in claim 20, wherein the biodegradable copolymer hydrogel is applied for drug release, cells delivery, growth factors delivery, nucleic acids delivery, tissue engineering, repair of soft and hard tissues, or bioadhesion.

36. The biodegradable copolymer hydrogel as claimed in claim 35, wherein the biodegradable copolymer hydrogel serves as a bioadhesion for adhering interfaces of cells, tissues, and implants, repair of soft and hard tissues, or implant fillers.

37. The biodegradable copolymer hydrogel as claimed in claim 20, wherein the biodegradable copolymer hydrogel is further mixed with a biological activity compound, ceramics, polymer, or metal.

38. The biodegradable copolymer hydrogel as claimed in claim 20, wherein the biodegradable copolymer hydrogel serves as a carrier of an injection, pastille, powder, gel or oral liquid.

* * * * *